(12) United States Patent
Sack et al.

(10) Patent No.: US 9,855,964 B2
(45) Date of Patent: Jan. 2, 2018

(54) STROLLER FRAME

(71) Applicant: Wonderland Switzerland AG, Steinhausen (CH)

(72) Inventors: Daniel Sack, Tuen Mun (HK); Curtis Hartenstine, Tuen Mun (HK); Ryan Miller, Tuen Mun (HK); Andrew Horst, Tuen Mun (HK)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 15/428,736

(22) Filed: Feb. 9, 2017

(65) Prior Publication Data

US 2017/0247043 A1   Aug. 31, 2017

Related U.S. Application Data

(60) Provisional application No. 62/301,256, filed on Feb. 29, 2016.

(51) Int. Cl.
*B62B 7/06* (2006.01)
*B62B 7/10* (2006.01)
*B62B 7/04* (2006.01)

(52) U.S. Cl.
CPC .............. *B62B 7/10* (2013.01); *B62B 7/044* (2013.01); *B62B 7/064* (2013.01); *B62B 7/068* (2013.01); *B60Y 2200/83* (2013.01); *B62B 2205/04* (2013.01); *B62B 2205/12* (2013.01); *B62B 2205/24* (2013.01); *B62B 2301/04* (2013.01)

(58) Field of Classification Search
CPC ................. B62B 7/062; B62B 7/064

USPC .......................... 280/642, 647, 650
See application file for complete search history.

(56) References Cited

U.S. PATENT DOCUMENTS

| | | | | |
|---|---|---|---|---|
| 5,370,572 A | * | 12/1994 | Lee | A63H 3/52 180/65.6 |
| 5,421,603 A | * | 6/1995 | Wills | B62B 7/08 280/642 |
| 5,752,738 A | * | 5/1998 | Onishi | B62B 7/08 280/642 |
| 6,086,086 A | * | 7/2000 | Hanson | A61G 5/00 280/642 |
| 6,715,783 B1 | * | 4/2004 | Hanson | B62B 7/10 280/47.38 |
| 7,021,651 B2 | * | 4/2006 | Lan | B60B 33/026 280/47.371 |
| 2005/0040626 A1 | * | 2/2005 | Papac | A61G 5/12 280/647 |

(Continued)

*Primary Examiner* — Jeffrey J Restifo
(74) *Attorney, Agent, or Firm* — Hamre, Schumann, Mueller & Larson, P.C.

(57) ABSTRACT

A stroller frame includes a seat pan, an operating handle movably coupled to the seat pan, and two opposite foldable side frame units each including a front leg, a handle rod, a rear leg that has a top end pivotally connected to the handle rod, a bottom leg that has a lower end pivotally connected to the rear leg, and a sliding basket tube that is movably coupled to said seat pan and slidably connected to said rear leg. To unfold the stroller frame, said operating handle is pushed downward to drive said seat pan to pivot downward so that an angle between said front leg and said bottom leg of each of said side frame units increases until said stroller frame is converted from a folded state to an unfolded state.

20 Claims, 11 Drawing Sheets

(56) References Cited

U.S. PATENT DOCUMENTS

| | | | | |
|---|---|---|---|---|
| 2007/0052208 A1* | 3/2007 | Chen | ............................ | B62B 7/10 |
| | | | | 280/642 |
| 2007/0262565 A1* | 11/2007 | Bearup | ................ | A61K 31/409 |
| | | | | 280/642 |
| 2008/0191451 A1* | 8/2008 | Driessen | .................... | B62B 7/08 |
| | | | | 280/650 |
| 2009/0309336 A1* | 12/2009 | Hanson | ..................... | A61G 5/08 |
| | | | | 280/647 |
| 2010/0237591 A1* | 9/2010 | Hartenstine | ............... | B62B 7/08 |
| | | | | 280/650 |
| 2011/0163519 A1* | 7/2011 | Van Gelderen | ......... | B62B 7/145 |
| | | | | 280/642 |
| 2011/0298198 A1* | 12/2011 | Minato | .................... | B62B 7/062 |
| | | | | 280/648 |
| 2012/0032419 A1* | 2/2012 | Li | ............................ | B62B 7/062 |
| | | | | 280/647 |
| 2012/0169021 A1* | 7/2012 | Santamaria | ............. | B62B 7/008 |
| | | | | 280/47.35 |
| 2013/0264798 A1* | 10/2013 | Haut | ......................... | B62B 7/06 |
| | | | | 280/647 |
| 2014/0145417 A1* | 5/2014 | Li | ............................. | B62B 7/08 |
| | | | | 280/650 |
| 2014/0327233 A1* | 11/2014 | Greger | ...................... | B62B 7/08 |
| | | | | 280/650 |
| 2017/0057533 A1* | 3/2017 | Ransil | ....................... | B62B 7/08 |
| 2017/0174244 A1* | 6/2017 | Sack | ........................ | B62B 7/062 |
| 2017/0217470 A1* | 8/2017 | Popp | ........................ | B62B 7/062 |
| 2017/0247043 A1* | 8/2017 | Sack | .......................... | B62B 7/10 |

\* cited by examiner

STROLLER FRAME

CROSS-REFERENCE TO RELATED APPLICATION

This application claims priority of U.S. Provisional Patent Application No. 62/301256, filed on Feb. 29, 2016.

FIELD

The disclosure relates to a stroller frame, and more particularly to a stroller frame that includes an operating handle for folding, transporting, and unfolding the stroller frame single-handedly without ever releasing one's grip on the handle.

BACKGROUND

Many strollers have in-seat fold straps and levers that are used to initiate a fold process, and are commonly referred to as fast-fold strollers. The fold process is quick and effortless, however the unfold process is commonly difficult and cumbersome. Therefore, there is a need for improving the design of the strollers to address the need for an easy unfold experience without compromising the fast action fold sequence.

SUMMARY

Therefore, an object of the disclosure is to provide a stroller frame that can be folded and unfolded single-handedly in a quick and easy manner.

According to one aspect of the disclosure, the stroller frame includes a seat pan, an operating handle, and two opposite foldable side frame units. The seat pan has two guide slots that are respectively formed in opposite lateral sides of the seat pan. The operating handle is movably coupled to the seat pan. The side frame units are respectively disposed at the opposite lateral sides of the seat pan. Each of the side frame units includes a front leg that is pivotally connected to the seat pan at a pivot point, a handle rod that has a pivot end portion pivotally connected to the front leg, a rear leg that has a top end pivotally connected to the handle rod and a bottom end opposite to the top end, a bottom leg that has a lower end pivotally connected to the bottom end of the rear leg and an upper end opposite to the lower end, a sliding basket tube that is slidably connected to the rear leg and that has a protruding portion pivotally and slidably engaging a respective one of the guide slots of the seat pan, and a sliding joint that surrounds said sliding basket tube for guiding sliding movement of said sliding basket tube relative to said rear leg during conversion of said stroller frame between a folded state and an unfolded state.

According to another aspect of the disclosure, the stroller frame includes a seat pan, an operating handle, and two opposite foldable side frame units. The operating handle is movably coupled to the seat pan. The side frame units are respectively disposed at opposite lateral sides of the seat pan. Each of the side frame units includes a front leg that is pivotally connected to the seat pan at a pivot point, a handle rod that has a pivot end portion pivotally connected to the front leg, a rear leg that has a top end pivotally connected to the handle rod and a bottom end opposite to the top end, a bottom leg that has a lower end pivotally connected to the bottom end of the rear leg and an upper end opposite to the lower end, and a sliding basket tube that is slidably connected to the rear leg and movably coupled to the seat pan.

The stroller frame is operable to a folded state, where a projection of the operating handle on an imaginary horizontal plane is located between a line defined between projections of the top ends of the rear legs on the imaginary horizontal plane and a line defined between projections of the upper ends of the bottom legs on the imaginary horizontal plane.

To unfold the stroller frame, the operating handle is pushed downward to drive the seat pan to pivot downward relative to the front leg of each of the side frame units, so that an angle between the front leg and the bottom leg of each of the side frame units increases until the stroller frame is converted from the folded state to an unfolded state.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
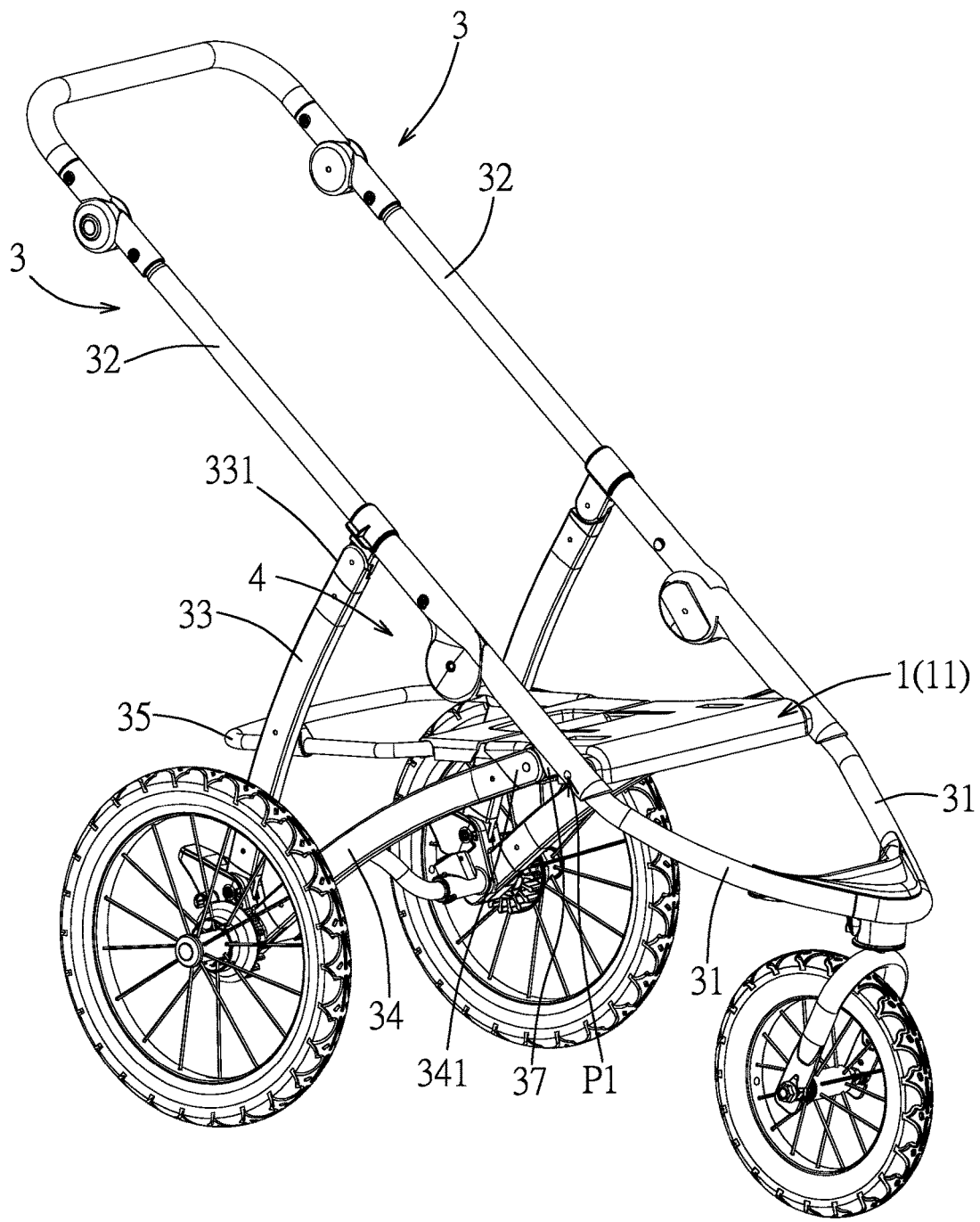
FIG. 1 is a perspective view illustrating a stroller including an embodiment of a stroller frame according to the disclosure.
Figure 2:
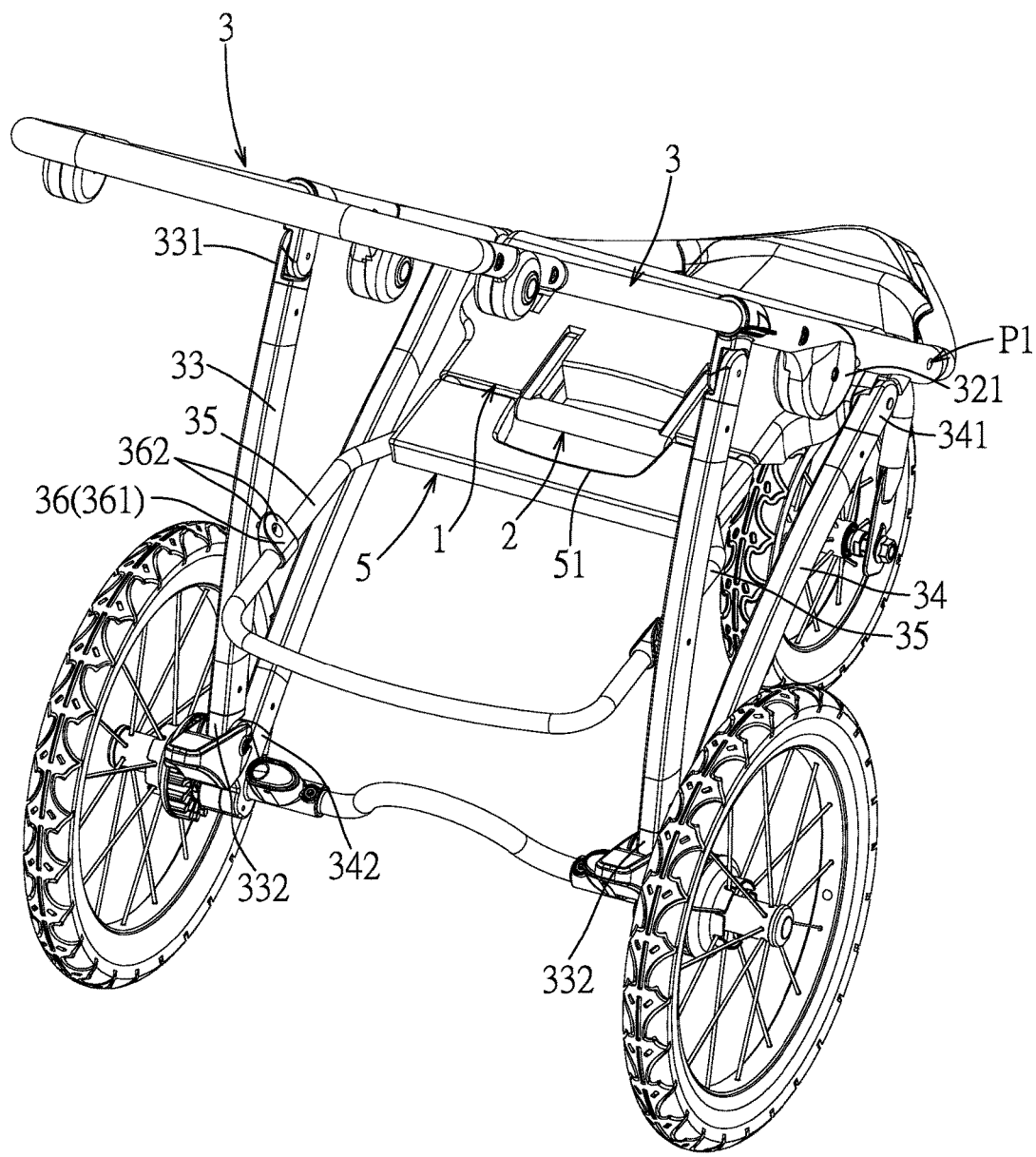
FIG. 2 is a perspective view of the stroller from another angle.
Figure 3:
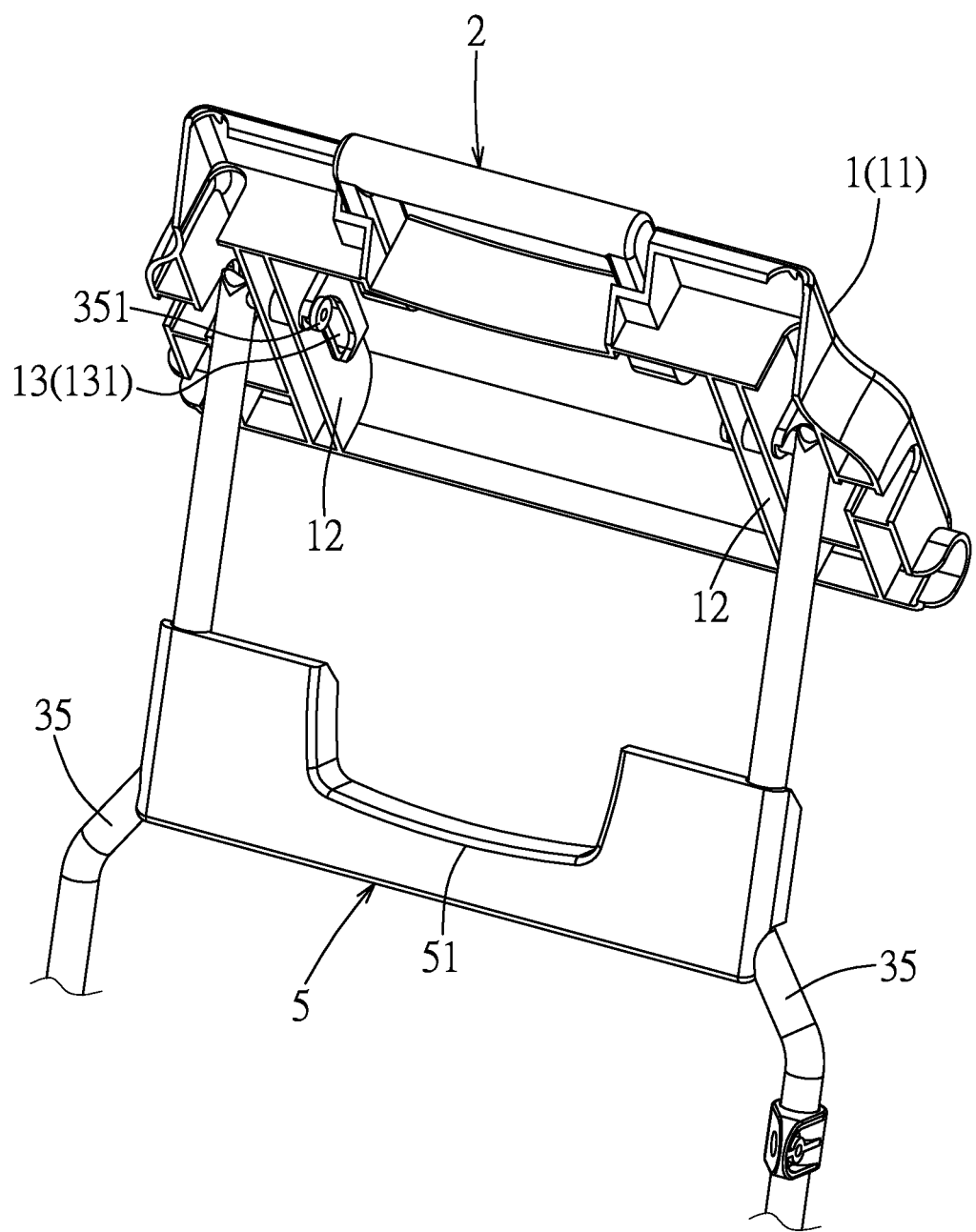
FIG. 3 is a fragmentary perspective view of a seat pan, a handle, an auxiliary plate, and two sliding basket tubes of the embodiment.

FIGS. 1 and 2 illustrate a stroller that includes an embodiment of a stroller frame according to the disclosure. The stroller frame is operable to move between a folded state (see FIG. 8) and an unfolded state (see FIGS. 1 and 11). Referring to FIGS. 1 to 3, the stroller frame includes a seat pan 1, an operating handle 2, two opposite foldable side frame units 3, and an auxiliary seat plate 5.

The seat pan 1 includes a base portion 11, and two side wall portions 12 that are disposed respectively at opposite lateral sides thereof, and that extend downward from the base portion 11. Each of the side wall portions 12 is formed with an arc-shaped guide slot 13.

The operating handle 2 is substantially U-shaped and is movably coupled to the seat pan 1.

The side frame units 3 are respectively disposed at the lateral sides of the seat pan 1. Since the side frame units 3 are symmetrical, only one of the side frame units 3 will be described in detail hereinafter for the sake of brevity. Each side frame unit 3 includes a front leg 31, a handle rod 32, a mounting seat 37, a rear leg 33, a bottom leg 34, a sliding basket tube 35, a sliding joint 36, and a lock mechanism 4.

Figure 6:
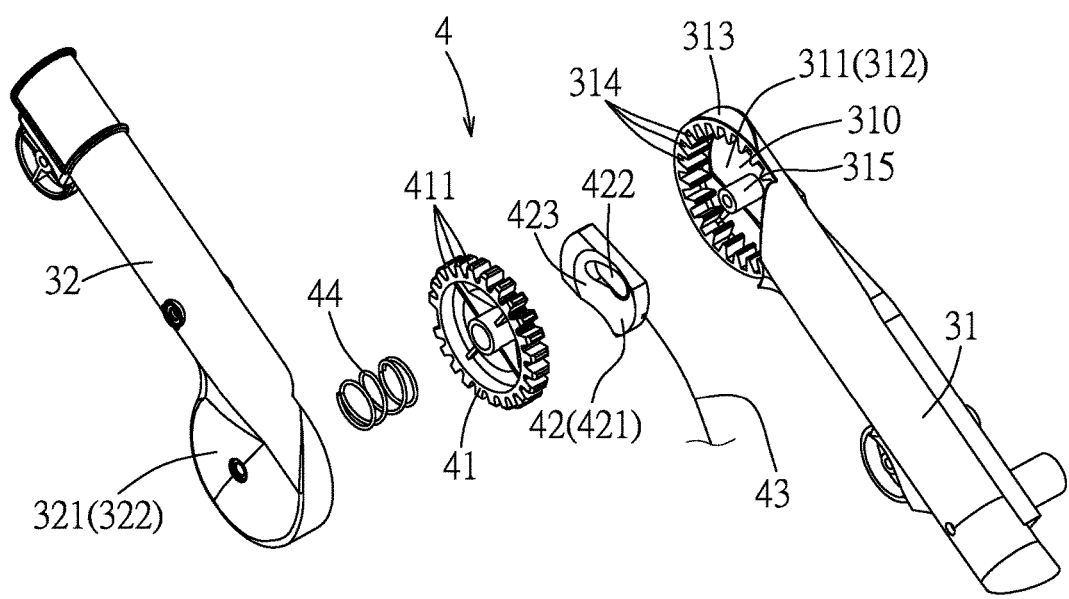
FIG. 6 is an exploded perspective view of the lock mechanism of the embodiment.

With further reference to FIG. 6, the front leg 31 is pivotally connected to the seat pan 1 at a pivot point (P1), and has a connecting end portion 311 located at a top end thereof. The connecting end portion 311 includes a substantially circular base wall 312, a surrounding wall 313, and a pin 315. The surrounding wall 313 extends from a periphery of the base wall 312, cooperates with the base wall 312 to define a first receiving space 310 therein, and has an inner surface formed with a plurality of angularly spaced-apart first engaging grooves 314. The pin 315 is fixedly disposed on a center of the base wall 312 in the first receiving space 310.

Figure 7:
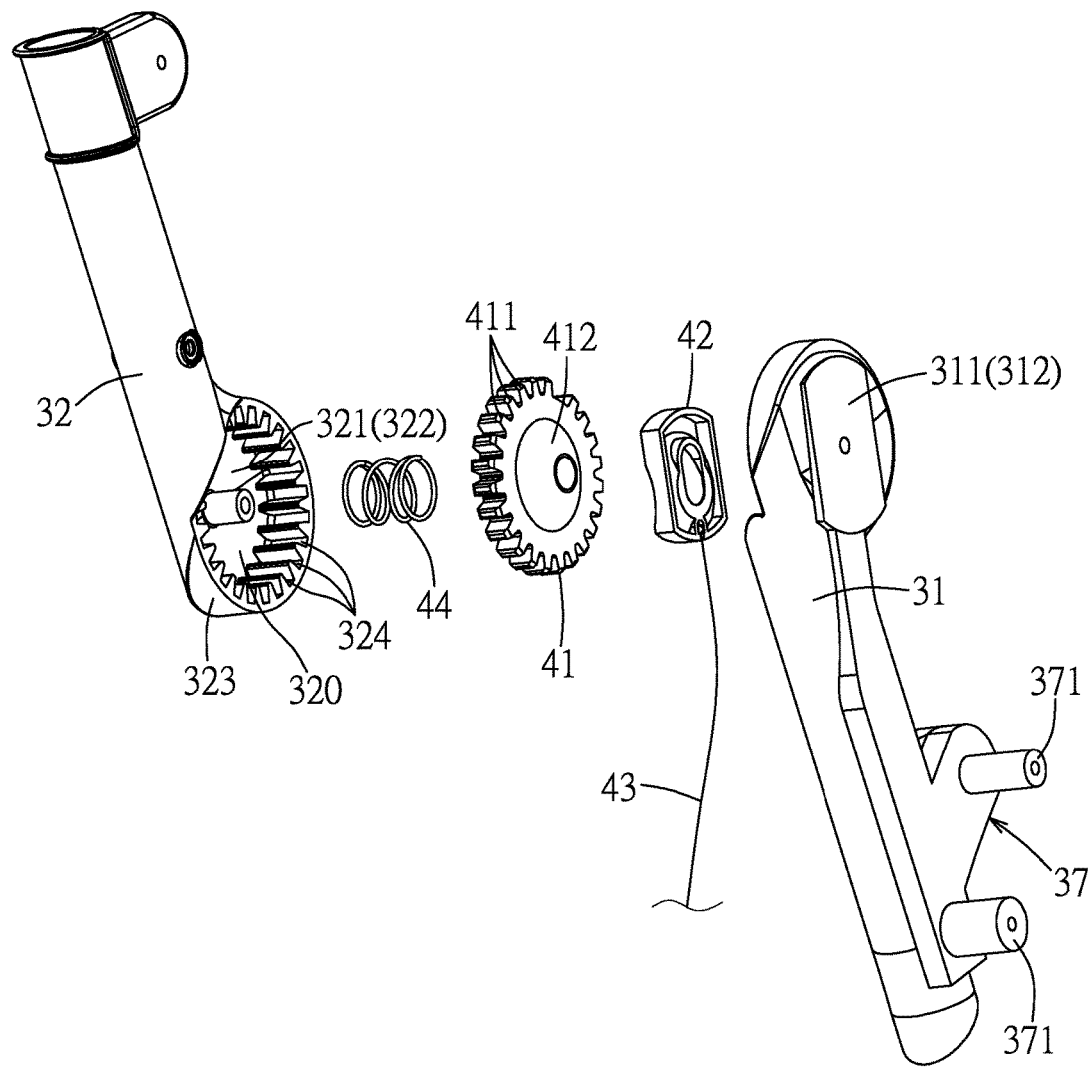
FIG. 7 is an exploded perspective view of the lock mechanism from another angle.

With further reference to FIG. 7, the handle rod 32 has a pivot end portion 321 pivotally connected to the connecting end portion 311 of the front leg 31. The pivot end portion 321 has a substantially circular base wall 322, a surrounding wall 323 that extends from a periphery of the base wall 322, that cooperates with the base wall 322 to define a second receiving space 320 therein, and that has an inner surface formed with a plurality of angularly spaced-apart second engaging grooves 324 corresponding in position to the first engaging grooves 314, respectively.

Figure 4:
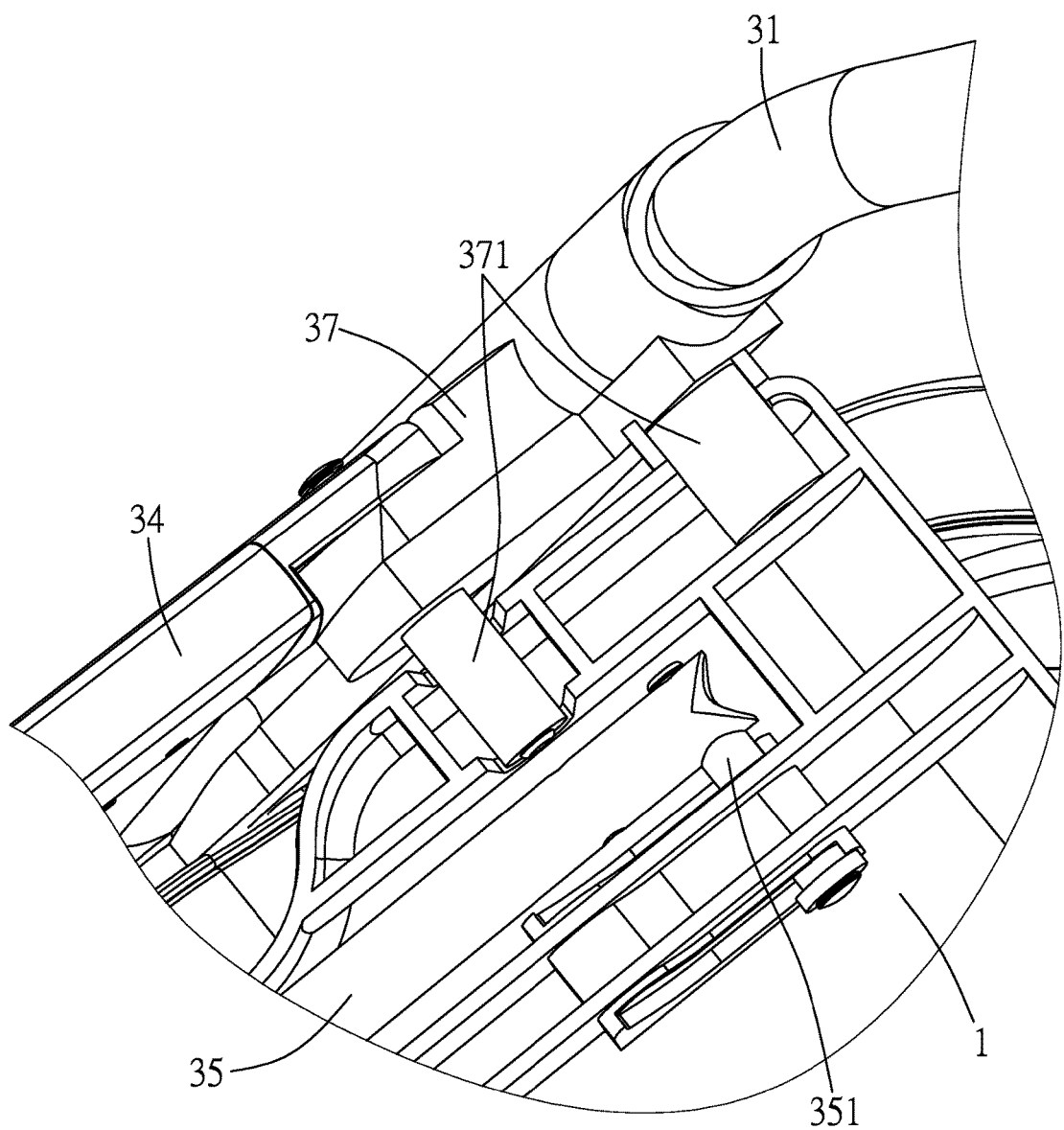
FIG. 4 is an enlarged fragmentary perspective view of the embodiment.
Figure 5:
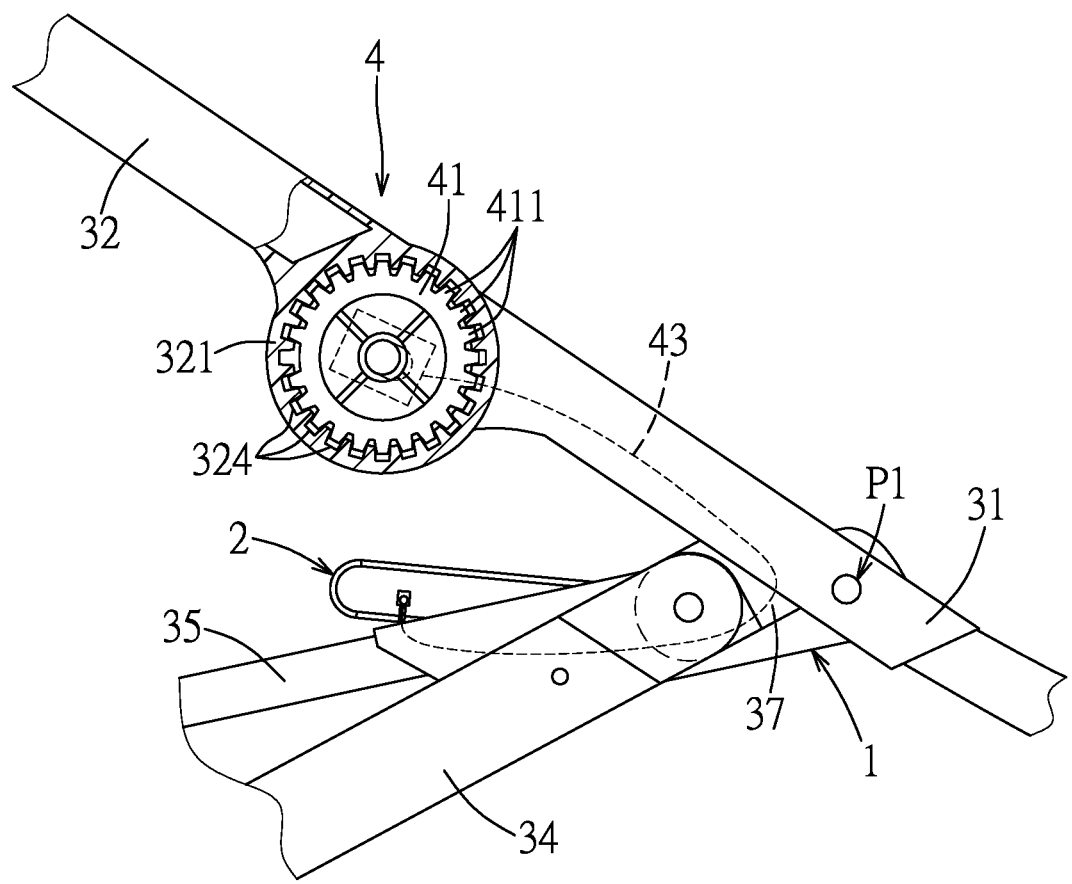
FIG. 5 is a schematic partly sectional side view illustrating a lock mechanism of the embodiment.

Referring to FIGS. 4 and 5, the mounting seat 37 protrudes rearwardly from the front leg 31, and is configured with a protruding boss that has two laterally-extending projections 371 spaced apart from each other. The projections 371 support the seat pan 1 when the stroller frame is in the unfolded state.

Referring to FIGS. 1 to 3, the rear leg 33 has a top end 331 pivotally connected to the handle rod 32, and a bottom end 332 opposite to the top end 331. The bottom leg 34 has a lower end 342 pivotally connected to the bottom end 332 of the rear leg 33, and an upper end 341 opposite to the lower end 342 and pivotally connected to the mounting seat 37, so as to be pivotable relative to the front leg 31.

The sliding basket tube 35 is pivotally connected to the upper end 341 of the bottom leg 34, is slidably connected to the rear leg 33, and has a protruding portion 351 extending laterally from an end portion of the sliding basket tube 35 for pivotally and slidably engaging a respective one of the guide slots 13 of the seat pan 1.

The sliding joint 36 (see FIG. 2) has a main body portion 361 sleeved on the sliding basket tube 35, and two end portions 362 pivoted to the rear leg 33 for guiding sliding movement of the sliding basket tube 35 relative to the rear leg 33 during conversion of the stroller frame between the folded state and the unfolded state.

Referring to FIGS. 5 to 7, the lock mechanism 4 includes a locking member 41, an actuating member 42, a cable 43, and a resilient member 44.

The locking member 41 is linked to the operating handle 2 through the cable 43, and is actuated by a pivotal movement of the operating handle 2. In greater detail, the locking member 41 is connected between the connecting end portion 311 of the front leg 31 and the pivot end portion 321 of the handle rod 32, has a plurality of teeth 411 that are engageable with the first and second engaging grooves 314, 324, and is movable between a locked position, where the teeth 411 engage the first and second engaging grooves 314, 324 so as to restrain pivotal movement of the handle rod 32 relative to the front leg 31, and an unlocked position, where the teeth 411 engage the second engaging grooves 324 and are disengaged from the first engaging grooves 314 so as to permit pivotal movement of the handle rod 32 relative to the front leg 31. In this embodiment, the locking member 41 is a gear.

The actuating member 42 is received in the first receiving space 310, is located between the locking member 41 and the base wall 312 of the connecting end portion 311 of the front leg 31, and is connected to the cable 43. The actuating member 42 has a substantially wedge-shaped structure being in slidable contact with the locking member 41, such that the locking member 41 is pushed toward the unlocked position by the actuating member 42 when the actuating member 42 is moved by a pulling force from the cable 43. The actuating member 42 is formed with an elongated slot 422 which extends in a direction of the pulling force and through which the pin 315 of the connecting end portion 311 of the front leg 31 extends, such that the actuating member 42 is restricted by the pin 315 to be movable only along the direction of the pulling force.

In this embodiment, the actuating member 42 has a concave surface 421, and the locking member 41 has a convex surface 412 being in slidable contact with the concave surface 421 of the actuating member 42. A portion 423 (see FIG. 6) of the actuating member 42 distal from the cable 43 forms the wedge-shaped structure.

The cable 43 has one end fixedly connected to the actuating member 42, and the other end fixedly connected to the operating handle 2. In this embodiment, the cable 43 is a steel wire.

The resilient member 44 is received in the second receiving space 320, and is disposed between the locking member 41 and the base wall 322 of the pivot end portion 321 of the handle rod 32 for biasing the locking member 41 toward the locked position. In this embodiment, the resilient member 44 is a compression spring.

When the stroller frame is in either one of the folded and unfolded states, the pulling force acted upon the cable 43 by an upward pivot movement of the operating handle 2 relative to the seat pan 1 drives the actuating member 42 to move the locking member 41 against a resilient force of the resilient member 44 to the unlocked position, thereby permitting conversion of the stroller frame between the folded and unfolded states.

Referring back to FIG. 2, the auxiliary seat plate 5 is connected between the sliding basket tubes 35 of the side frame units 3, and is formed with a recess 51 in one side thereof and corresponding in position to the operating handle 2 when the stroller frame is in the unfolded state for easy access of the operating handle 2.

Figure 8:
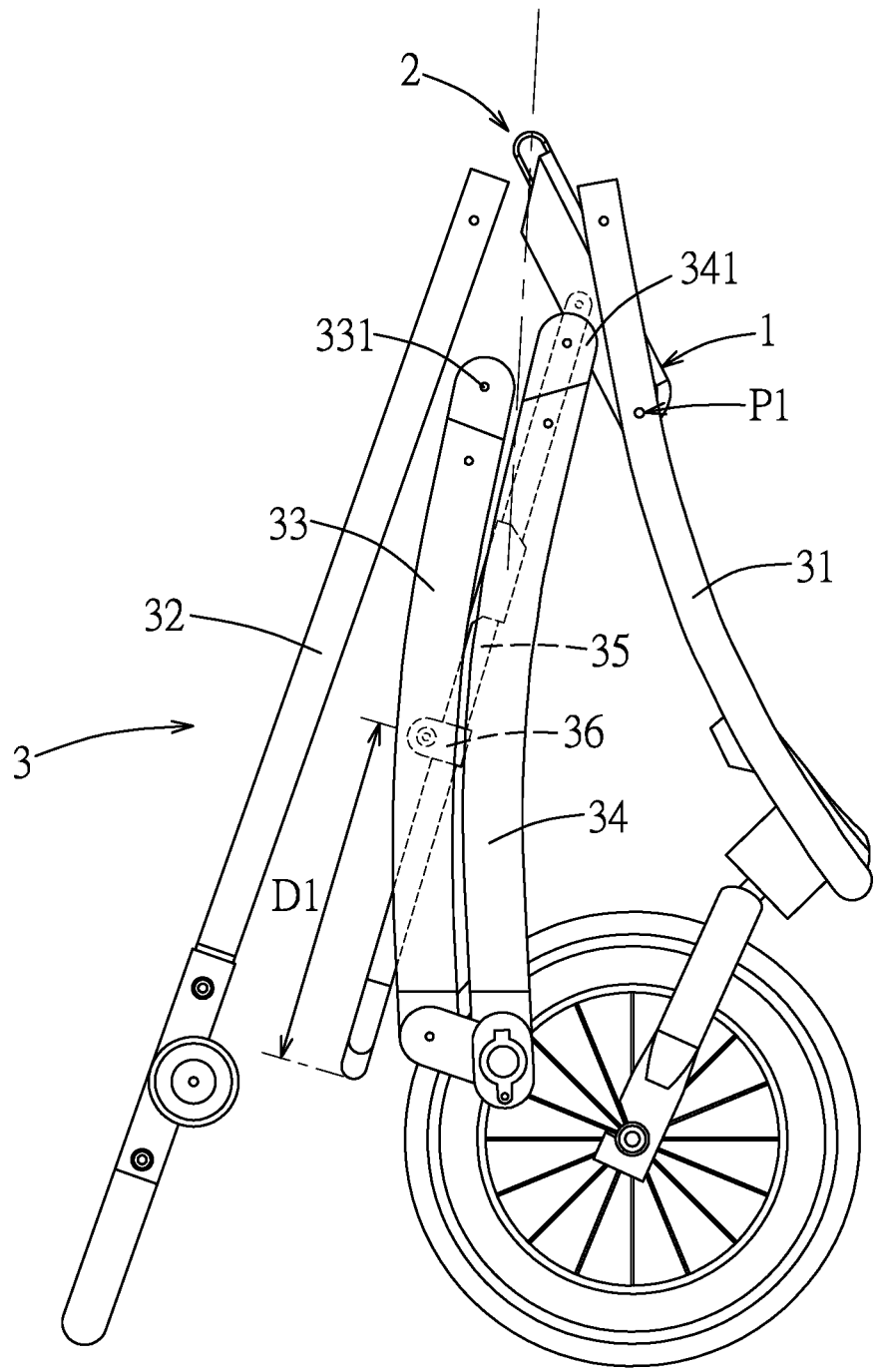
FIG. 8 is a schematic side view of the embodiment, illustrating the stroller frame in a folded state.

Referring to FIG. 8, the seat pan 1, the operating handle 2, and the side frame units 3 are specifically oriented so that a vertical downward force exerted on the operating handle 2 can drive the stroller frame to move to the unfolded state. More specifically, when the stroller frame is operated to the folded state, the operating handle 2 is located higher than the pivot point (P1) of each of the side frame units 3, and a projection of the operating handle 2 on an imaginary horizontal plane (not shown) is located between a line defined between projections of the top ends 331 of the rear legs 33 on the imaginary horizontal plane and a line defined between projections of the upper ends 341 of the bottom legs 34 on the imaginary horizontal plane.

Figure 9:
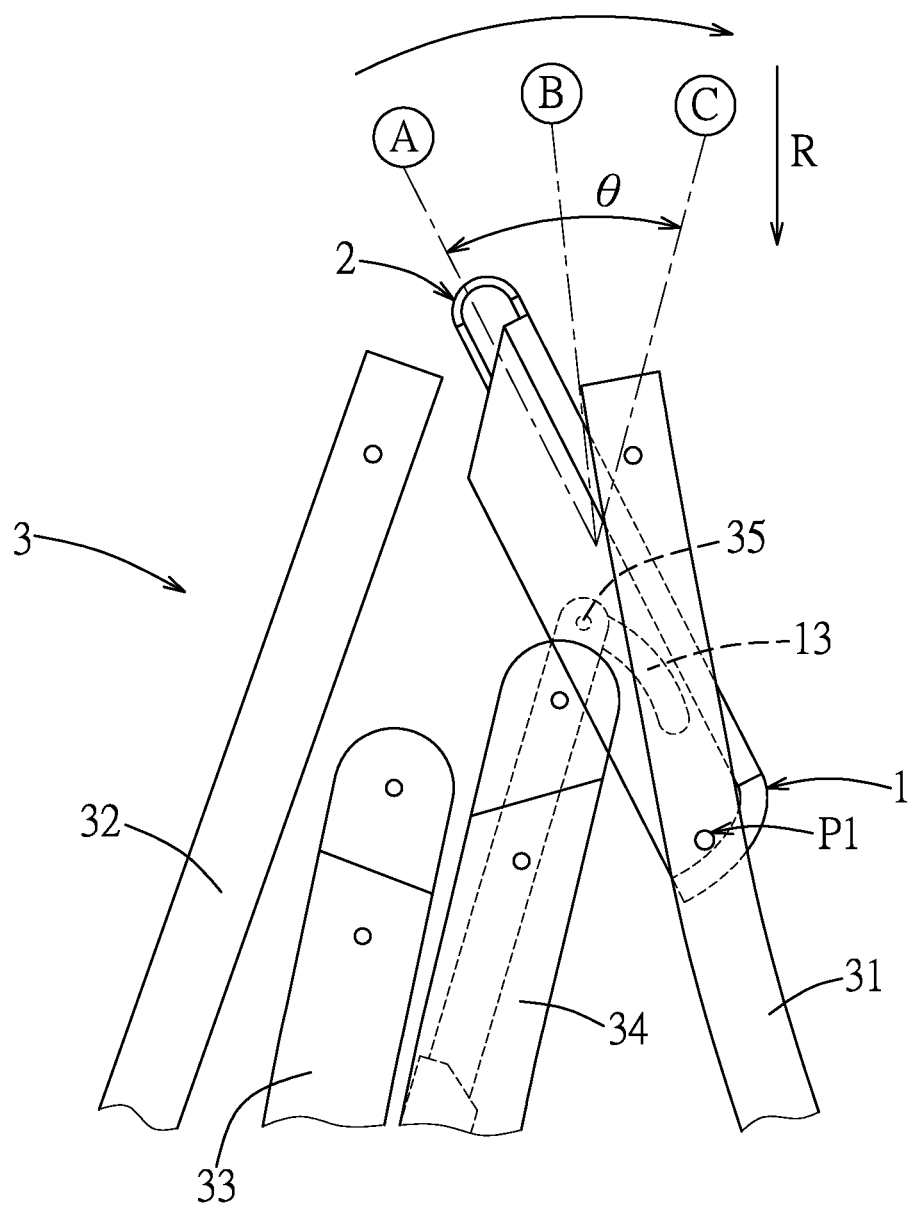
FIG. 9 is a fragmentary schematic side view of the embodiment, illustrating the handle being rotatable to different positions relative to the seat pan.

In this embodiment, the operating handle 2 has first, second and third operating positions (A, B, C), as indicated by the phantom lines in FIG. 9. The first operating position (A) corresponds to a natural resting place of the operating handle 2. The second and third operating positions (B, C) correspond to different pivoting movements of the operating handle 2, and the second operating position (B) is between the first and third operating positions (A, C). The operating handle 2 is at the second operating position (B) when the stroller frame is carried and locked. When the operating handle 2 is at the third operating position (C), the locking member 41 is at the unlocked position. Moreover, at the third operating position (C), a rotational angle (θ) formed between the operating handle 2 and the seat pan 1 is large enough to create the pulling force to move the locking member 41 to the unlocked position. The operating handle 2 may be calibrated to allow for movement of the locking member 41 to the unlocked position only when the operating handle 2 is rotated to the third operating position (C).

Figure 10:
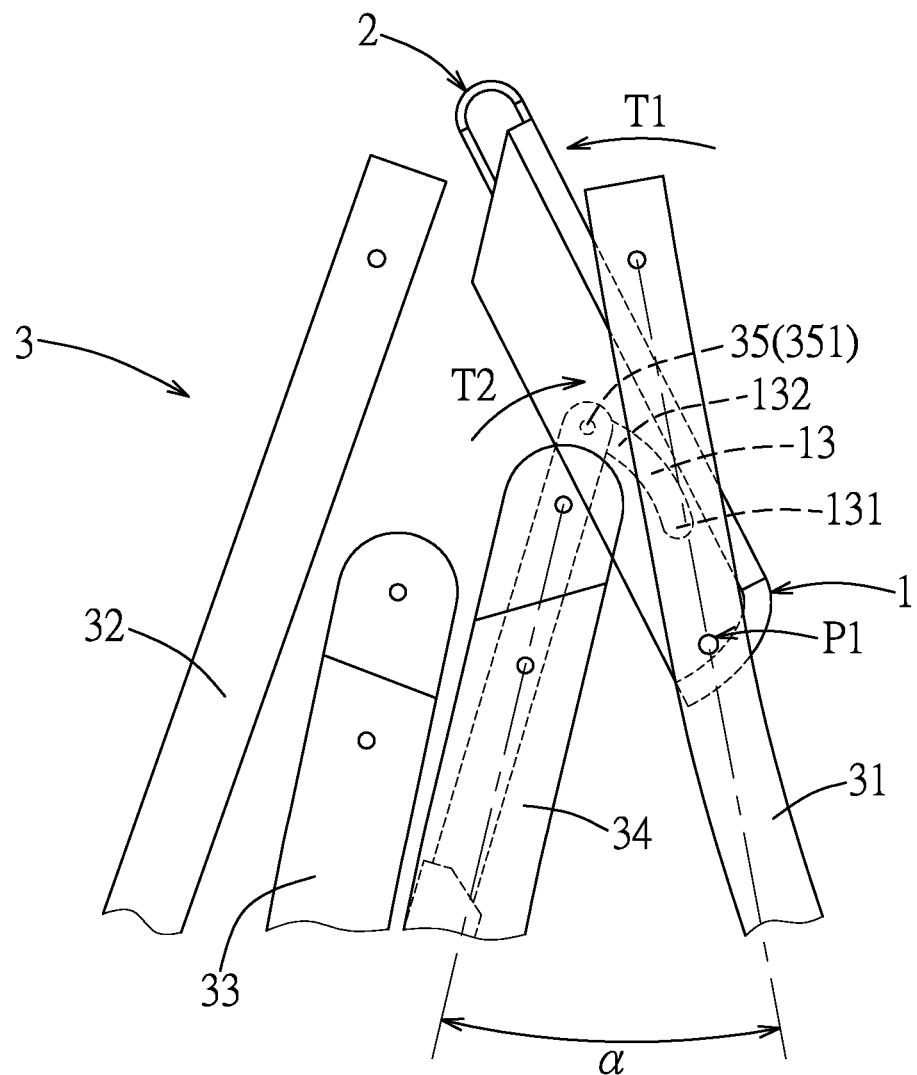
FIG. 10 is a fragmentary schematic side view of the embodiment, illustrating operation of the stroller frame from the folded state toward an unfolded state.

Referring to FIGS. 8 to 10, to unfold the stroller frame from the folded state, first the operating handle 2 is rotated from the first operating position (A) to the third operating position (C) to move the locking member 41 to the unlocked position, and then the operating handle 2 is pushed vertically downward (as indicated by an arrow (R) in FIG. 9) to drive the seat pan 1 to pivot downward relative to the front leg 31 of each of the side frame units 3, so that the protruding portion 351 (see FIG. 10) of the sliding basket tube 35 of each of the side frame units 3 slides alone the respective one of the guide slots 13, and that an angle (α) between the front leg 31 and the bottom leg 34 of each of the side frame units 3 increases until the stroller frame is converted to the unfolded state.

To be more specific, as shown in FIG. 10, each of the guide slots 13 has opposite first and second slot end portions 131, 132 that are respectively proximate to and distal from the pivot point (P1) of a respective one of the side frame units 3. When the stroller frame is converted from the folded state to the unfolded state, the seat pan 1 is pivoted relative to the front leg 31 of each of the side frame units 3 in a first direction (T1) while the protruding portion 351 of the sliding basket tube 35 of each of the side frame units 3 slides from the second slot end portion 132 to the first slot end portion 131 of the respective one of the guide slots 13 in a second direction (T2) which is opposite to the first direction (T1). When the protruding portion 351 of the sliding basket tube 35 of each of the side frame units 3 is at the first slot end portion 131 of the respective guide slot 13, the sliding basket tubes 35 of the side frame units 3 are allowed to be pivoted relative to the seat pan I until the stroller frame is completely converted to the unfolded state.

It should be noted that as the seat pan 1 is pivoted downward, the seat pan 1 contacts the projections 371 (see FIG. 4) of the protruding boss of each of the side frame units 3, which helps to drive the stroller frame to the unfolded state.

Figure 11:
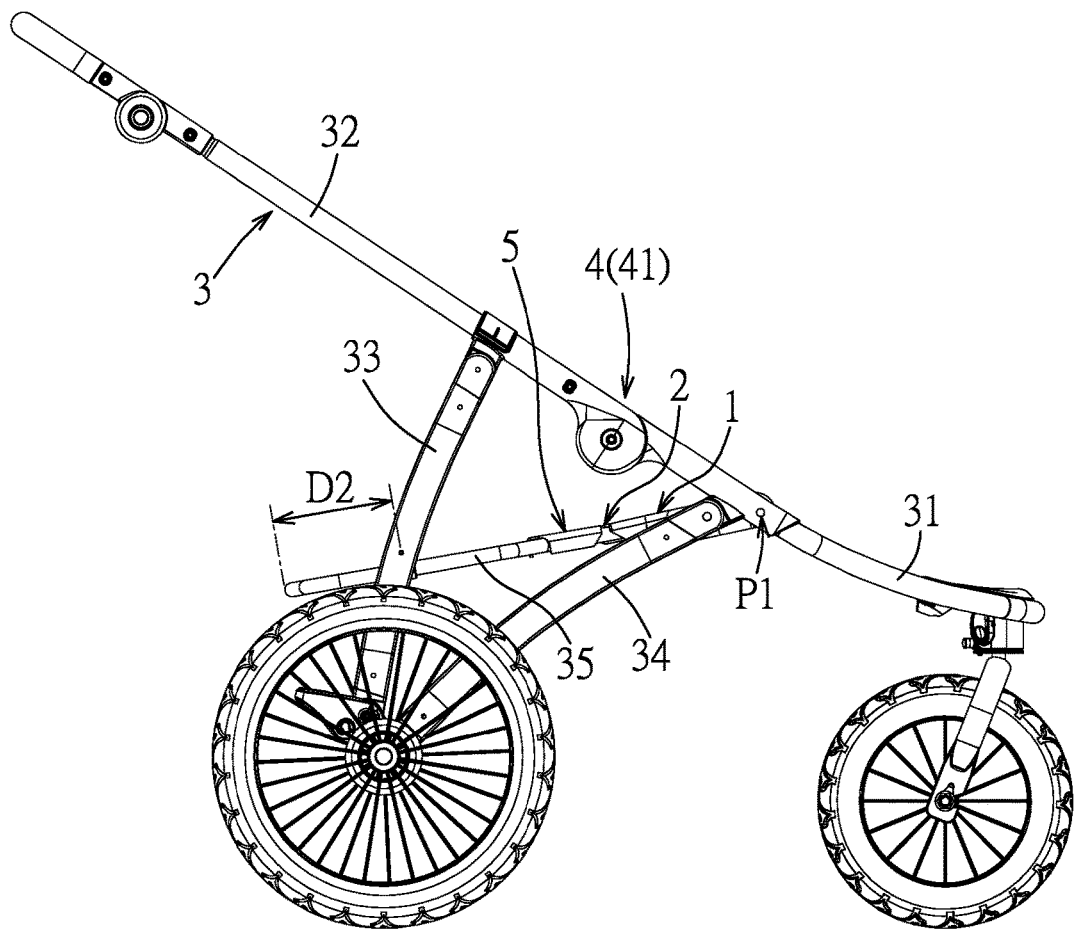
FIG. 11 is a side view of the embodiment, illustrating the stroller frame in the unfolded state.

Referring to FIGS. 8 and 11, during conversion of the stroller frame from the folded state to the unfolded state, the sliding basket tube 35 of each of the side frame units 3 slides relative to a respective one of the rear leg 33, such sliding movement contributes to unfolding of the stroller frame. For each side frame unit 3, since the sliding basket tube 35 is pivoted to the upper end 341 of the bottom leg 34 and is connected to the front leg 31 via the mounting seat 37, the connection between the sliding basket tube 35 and the rear leg 33 requires an additional degree of freedom, which is provided by connecting the sliding basket tube 35 and the rear leg 33 via the sliding joint 36. For each side frame unit 3, the sliding basket tube 35 has one end coupled to the seat pan 1 and an opposite end, and a distance between the sliding joint 36 and the opposite end of the sliding basket tube 35 decreases during the conversion of the stroller frame from the folded state to the unfolded state, as illustrated by a distance (D1) in FIG. 8 (in the folded state) and a distance (D2) in FIG. 11 (in the unfolded state), where the distance (D1) is greater than the distance (D2).

When the stroller frame is in the unfolded state, as shown in FIG. 11, the sliding basket tube 35 of each of the side frame units 3 extends substantially parallel to the seat pan 1 and supports the seat pan 1. At this time, the handle 2 is returned back to the first operating position (A) (see FIG. 9) and the locking member 41 is moved back to the locked position.

To fold the stroller frame from the unfolded state, first the operating handle 2 is rotated from the first operating position (A) to the third operating position (C) to move the locking member 41 to the unlocked position, and then the operating handle 2 is pulled upward to drive the seat pan 1 to pivot upward relative to the front leg 31 of each of the side frame units 3 such that the front leg 31, the bottom leg 34, and the rear leg 33 of each of the side frame units 3 move toward one another so that the stroller frame is converted to the folded state.

In summary, the incorporation of the operating handle 2 into the seat pan 1 and the configuration of the operating handle 2 enable a user to fold, transport, and unfold the stroller frame with one hand and without ever releasing grip on the operating handle 2, thereby improving convenience in operation and transport of the stroller frame. The positions and orientations of the operating handle 2 relative to the seat pan 1 and relative to the components of the side frame units 3 are cleverly designed so that the operating handle 2 is positioned for easy carrying when the stroller frame is in the folded state, and the stroller frame can be folded and unfolded in a quick and easy manner.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," " "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A stroller frame comprising:
   a seat pan having two guide slots that are respectively formed in opposite lateral sides of said seat pan;
   an operating handle movably coupled to said seat pan; and
   two opposite foldable side frame units respectively disposed at said opposite lateral sides of said seat pan, each of said side frame units including
      a front leg that is pivotally connected to said seat pan at a pivot point,
      a handle rod that has a pivot end portion pivotally connected to said front leg, a rear leg that has a top end pivotally connected to said handle rod, and a bottom end opposite to said top end, a bottom leg that has a lower end pivotally connected to said bottom end of said rear leg, and an upper end opposite to said lower end, a sliding basket tube that is slidably connected to said rear leg, and that has a protruding portion pivotally and slidably engaging a respective one of said guide slots of said seat pan, and a sliding joint that surrounds said sliding basket tube for guiding sliding movement of said sliding basket tube relative to said rear leg during conversion of said stroller frame between a folded state and an unfolded state.

2. The stroller frame as claimed in claim 1, wherein to fold said stroller frame from the unfolded state, said operating handle is pulled upward to drive said seat pan to pivot upward relative to said front leg of each of said side frame units such that said front leg, said bottom leg, and said rear leg of each of said side frame units move toward one another to convert said stroller frame to the folded state.

3. The stroller frame as claimed in claim 2, wherein:
said seat pan includes a base portion, and two side wall portions that are disposed respectively at said lateral sides thereof, that extend downward from said base portion, and that respectively have said guide slots; and
said protruding portion of said sliding basket tube of each of said side frame units extends laterally from an end portion of said sliding basket tube to slidably engage the respective one of said guide slots.

4. The stroller frame as claimed in claim 3, wherein:
each of said guide slots is arc-shaped, and has opposite first and second slot end portions that are respectively proximate to and distal from said pivot point of a respective one of said side frame units;
when said stroller frame is converted from the folded state to the unfolded state, said seat pan is pivoted relative to said front leg of each of said side frame units in a first direction while said protruding portion of said sliding basket tube of each of said side frame units slides from said second slot end portion to said first slot end portion of the respective one of said guide slots in a second direction which is opposite to the first direction; and
when said stroller frame is in the unfolded state, said sliding basket tube of each of said side frame units extends substantially parallel to said seat pan and supports said seat pan.

5. The stroller frame as claimed in claim I, wherein each of said side frame units further has a locking member that is connected between said handle rod and said front leg, and that is operable to move between a locked position and an unlocked position for restraining and permitting pivotal movement of said handle rod relative to said front leg, respectively.

6. The stroller frame as claimed in claim 5, wherein said locking member is linked to said operating handle through a cable, and is actuated by a pivotal movement of said operating handle.

7. The stroller frame as claimed in claim 6, wherein, said operating handle has first, second and third operating positions, where the first operating position corresponds to a natural resting place of the operating handle, the second and third operating positions correspond to different pivoting movements of the operating handle, and the second operating position is between the first and third operating positions.

8. The stroller frame as claimed in claim 7, wherein, said locking member is at the unlocked position when the operating handle is at the third operating position, and said operating handle is at the second operating position when said stroller frame is carried and locked.

9. The stroller frame as claimed in claim 1, wherein said sliding joint of each of said side frame units has a main body portion sleeved on said sliding basket tube, and two end portions pivoted to said rear leg for guiding sliding movement of said sliding basket tube relative to said rear leg during conversion of said stroller frame between the folded state and the unfolded state.

10. The stroller frame as claimed in claim 9, wherein:
said sliding basket tube of each of said side frame units has one end coupled to said seat pan, and an opposite end; and
a distance between said sliding joint and said opposite end of said sliding basket tube decreases during the conversion of said stroller frame from the folded state to the unfolded state.

11. The stroller frame as claimed in claim 1, further comprising an auxiliary seat plate that is connected between said sliding basket tubes of said side frame units, and that is formed with a recess in one side thereof and corresponding in position to said operating handle when said stroller frame is in the unfolded state for easy access of said operating handle.

12. A stroller frame comprising:
a seat pan;
an operating handle movably coupled to said seat pan; and
two opposite foldable side frame units respectively disposed at opposite lateral sides of said seat pan, each of said side frame units including
a front leg that is pivotally connected to said seat pan at a pivot point,
a handle rod that has a pivot end portion pivotally connected to said front leg,
a rear leg that has a top end pivotally connected to said handle rod, and a bottom end opposite to said top end,
a bottom leg that has a lower end pivotally connected to said bottom end of said rear leg, and an upper end opposite to said lower end, and
a sliding basket tube that is slidably connected to said rear leg and movably coupled to said seat pan;
wherein said stroller frame is operable to a folded state, where a projection of said operating handle on an imaginary horizontal plane is located between a line defined between projections of said top ends of said rear legs on the imaginary horizontal plane and a line defined between projections of said upper ends of said bottom legs on the imaginary horizontal plane;
wherein, to unfold said stroller frame, said operating handle is pushed downward to drive said seat pan to pivot downward relative to said front leg of each of said side frame units, so that an angle between said front leg and said bottom leg of each of said side frame units increases until said stroller frame is converted from the folded state to an unfolded state, said sliding basket tube sliding relative to said rear leg during conversion of said stroller frame between the unfolded state and the folded state.

13. The stroller frame as claimed in claim 12, wherein each of said side frame units further including a sliding joint that has a main body portion sleeved on said sliding basket tube, and two end portions pivoted to said rear leg for guiding sliding movement of said sliding basket tube relative to said rear leg during the conversion of said stroller frame between the unfolded state and the folded state.

14. The stroller frame as claimed in claim 13, wherein:
   said sliding basket tube of each of said side frame units has one end coupled to said seat pan, and an opposite end; and
   a distance between said sliding joint and said opposite end of said sliding basket tube decreases during the conversion of said stroller frame from the folded state to the unfolded state.

15. The stroller frame as claimed in claim14, wherein to fold said stroller frame from the unfolded state, said operating handle is pulled upward to drive said seat pan to pivot upward relative to said front leg of each of said side frame units such that said front leg, said bottom leg, and said rear leg of each of said side frame units move toward one another to convert said stroller frame to the folded state.

16. The stroller frame as claimed in claim 15, wherein:
   said seat pan includes a base portion, and two side wall portions that are disposed respectively at said lateral sides of said seat pan and that extend downward from said base portion, each of said side wall portions being formed with a guide slot; and
   said sliding basket tube of each of said side frame units has a protruding portion extending laterally from an end portion of said sliding basket tube to slidably engage said guide slot of a respective one of said side wall portions.

17. The stroller frame as claimed in claim 16, wherein:
   each of said guide slots is arc-shaped, and has opposite first and second slot end portions that are respectively proximate to and distal from said pivot point of a respective one of said side frame units;
   when said stroller frame is converted from the folded state to the unfolded state, said seat pan is pivoted relative to said front leg of each of said side frame units in a first direction while said protruding portion of said sliding basket tube of each of said side frame units slides from said second slot end portion to said first slot end portion of the respective one of said guide slots in a second direction which is opposite to the first direction; and
   when said stroller frame is in the unfolded state, said sliding basket tube of each of said side frame units extends substantially parallel to said seat pan and supports said seat pan.

18. The stroller frame as claimed in claim 12, wherein each of said side frame units further has a locking member that is connected between said handle rod and said front leg, and that is operable to move between a locked position and an unlocked position for restraining and permitting pivotal movement of said handle rod relative to said front leg, respectively.

19. The stroller frame as claimed in claim18, wherein said locking member is linked to said operating handle through a cable, and is actuated by a pivotal movement of the operating handle.

20. The stroller frame as claimed in claim 19, wherein, said operating handle has first, second and third operating positions, where said locking member is at the unlocked position when the operating handle is at the third operating position, and said operating handle is at the second operating position when said stroller frame is carried and locked.

* * * * *